(12) United States Patent
Fujiwara

(10) Patent No.: US 7,082,853 B2
(45) Date of Patent: Aug. 1, 2006

(54) APPARATUS FOR APPLYING A REACTION FORCE TO A PIVOTALLY SUPPORTED PEDAL MEMBER UPON DEPRESSION THEREOF

(75) Inventor: Noboru Fujiwara, Toyota (JP)

(73) Assignee: Toyoda Iron Works Co., Ltd., Aichi-Ken (JP)

( * ) Notice: Subject to any disclaimer, the term of this patent is extended or adjusted under 35 U.S.C. 154(b) by 153 days.

(21) Appl. No.: 10/656,151

(22) Filed: Sep. 8, 2003

(65) Prior Publication Data
US 2005/0145057 A1 Jul. 7, 2005

(30) Foreign Application Priority Data
Sep. 4, 2003 (JP) ............... 2003-312200

(51) Int. Cl.
G05G 1/14 (2006.01)
F16H 53/00 (2006.01)
(52) U.S. Cl. ............. 74/512; 74/560; 74/567; 74/569
(58) Field of Classification Search .............. 74/512, 74/518, 560, 513, 514, 567, 569; 192/99 S, 192/85 R; B60T 13/02; G05G 1/14
See application file for complete search history.

(56) References Cited

U.S. PATENT DOCUMENTS

| | | | | |
|---|---|---|---|---|
| 3,798,995 | A | * | 3/1974 | Schroter ................ 74/512 |
| 4,386,537 | A | * | 6/1983 | Lewis ................... 74/512 |
| 5,268,624 | A | | 12/1993 | Zanger |
| 5,350,225 | A | | 9/1994 | Steiner et al. |
| 5,823,064 | A | * | 10/1998 | Cicotte ................. 74/512 |
| 5,887,954 | A | | 3/1999 | Steiner et al. |
| 6,105,737 | A | | 8/2000 | Weigert et al. |
| 6,155,385 | A | * | 12/2000 | Basnett ................. 188/72.7 |
| 6,446,526 | B1 | * | 9/2002 | Reimann et al. ........... 74/512 |
| 6,679,366 | B1 | * | 1/2004 | Tulaczko et al. ......... 192/99 S |
| 6,837,356 | B1 | * | 1/2005 | Tulaczko et al. ......... 192/99 S |
| 2005/0172753 | A1 | * | 8/2005 | Fujiwara .................. 74/512 |

FOREIGN PATENT DOCUMENTS

| | | | |
|---|---|---|---|
| DE | 26 38 962 | * | 3/1978 |
| FR | 2 822 428 | | 9/2002 |
| GB | 2 114 717 | | 8/1983 |

(Continued)

OTHER PUBLICATIONS

European Search Report dated Aug. 25, 2004.

*Primary Examiner*—Vinh T. Luong
(74) *Attorney, Agent, or Firm*—Finnegan, Henderson, Farabow, Garrett & Dunner, LLP (57) ABSTRACT

An apparatus for applying a reaction force to a pedal member. The apparatus includes: a reaction-force applying device for applying the reaction force to the pedal member and changing the reaction force; and a reaction-force controlling device for controlling or changing the reaction force on the basis of a depressing stroke of the pedal member, according to a predetermined pattern of change of the reaction force. The reaction-force applying device includes a spring member connected at one of its opposite ends to a connected portion of the pedal member for applying a reaction force to the pedal member; and a pivotable cam member held in engagement with the other end of the spring member, such that the other end of the spring member is movable toward and away from the connected portion of the pedal member, in response to pivot motion of the cam member.

7 Claims, 7 Drawing Sheets

| | FOREIGN PATENT DOCUMENTS | | | JP | 2001-247020 | 9/2001 |
|---|---|---|---|---|---|---|
| | | | | JP | 2001-278021 | 10/2001 |
| GB | 2 383628 | 7/2003 | | JP | 2002-308084 | 10/2002 |
| JP | 2000-280872 | 10/2000 | | | | |
| JP | 2001-239930 | 9/2001 | | * cited by examiner | | |

APPARATUS FOR APPLYING A REACTION FORCE TO A PIVOTALLY SUPPORTED PEDAL MEMBER UPON DEPRESSION THEREOF

BACKGROUND OF THE INVENTION

1. Field of the Invention

The present invention relates to an improvement in a pedal reaction force applying apparatus for applying a pedal reaction force to a pedal member whose depressing stroke is electrically detected so that a hydraulically or otherwise operated brake is activated on the basis of the detected depressing stroke of the pedal member.

2. Discussion of Prior Art

There is proposed a brake-by-wire braking system, as a service braking system for a vehicle, in which a depressing stroke (pivot amount) of a pedal member is electrically detected so that an actuator such as a hydraulically operated device and an electrically operated motor is activated on the basis of the detected depressing stroke. In such a braking system, the pedal member receives only very small amount of pedal reaction force which is generated merely by a return spring provided in the pedal member. Therefore, there is a problem that the brake-by-wire braking system is difficult to operate, for a driver accustomed to a hydraulically or vacuum boosted braking system. In view of this, Patent Document 1 proposes a pedal reaction force applying apparatus which positively applies a pedal reaction force to a pedal member, by using a spring member such as torsion coil spring. Patent Document 2 proposes to displace a spring seat by rotating a cam with an electric motor, for changing a pedal reaction force depending upon a running condition such as snow-covered road surface. Patent Document 3 proposes to generate a braking force by using a depressing-force sensor and a stroke sensor, and control an amount of a pedal reaction force on the basis of difference between the generated braking force and its target value.

[Patent Document 1] JP-A-2001-239930

[Patent Document 2] JP-A-2001-247020

[Patent Document 3] JP-A-2001-278021

However, in the above-described conventional pedal reaction force applying apparatus, due to difference between characteristic of a pedal reaction force imparted by a spring member and characteristic of a pedal reaction force imparted by a conventional brake booster, a driver accustomed to a hydraulically or vacuum boosted braking system is likely to have a strange feeling in depressing the pedal member. In the technique of the Patent Document 1, the pedal reaction force is imparted merely by the spring member. In the technique of the Patent Document 2, the pedal reaction force is changed merely depending upon the road surface condition. In the technique of the Patent Document 3, the amount of the pedal reaction force is controlled merely on the basis of the difference between the generated braking force and its target value. That is, in any one of the conventional pedal reaction force applying apparatuses, the pedal reaction force in relation with the depressing stroke cannot be changed according to a desired change pattern so that it is not always possible to obtain a sufficiently satisfactory pedal maneuverability.

The present invention was made under the above-described background with object of providing a pedal reaction force applying apparatus in which it is possible to easily establish a pedal reaction force whose characteristic is close to the characteristic of a conventional brake booster, and accordingly easily obtain an excellent pedal maneuverability.

SUMMARY OF THE INVENTION

For achieving the above object, a first aspect of the invention is, in a pedal reaction force applying apparatus for applying a predetermined pedal reaction force to a pedal member which is operationally depressed to be pivoted about a support axis, characterized in that there is proposed (a) a reaction-force applying device for applying the pedal reaction force to the pedal member and changing the pedal reaction force; and (b) a reaction-force controlling device for activating the reaction-force applying device such that the pedal reaction force is changed on the basis of a depressing stroke of the pedal member, according to a predetermined pattern of change of the pedal reaction force.

A second aspect of the invention is, in the pedal reaction force applying apparatus of the first aspect of the invention, characterized in that the reaction-force applying device includes: (a) a spring member which is connected, at one of opposite ends thereof, with a predetermined connected portion of the pedal member that is distant from the support axis, and which is mechanically elastically deformed upon depression of the pedal member, for thereby applying the pedal reaction force to the pedal member; and (b) a reaction-force changing mechanism for changing the pedal reaction force, by displacing the one of the opposite ends of the spring member relative to the connected portion of the pedal member, or by moving the other of the opposite ends of the spring member toward and away from the connected portion of the pedal member.

A third aspect of the invention is, in the pedal reaction force applying apparatus of the second aspect of the invention, characterized in that the reaction-force changing mechanism includes a cam member which is pivotable about an pivot axis and which has an engaged portion whose distance from the pivot axis is continuously changed, and wherein the engaged portion of the cam member is held in engagement with the other of the opposite ends of the spring member, so that the other of the opposite ends of the spring member is movable toward and away from the connected portion of the pedal member, by the engaged portion as a result of pivot motion of the cam member.

A fourth aspect of the invention is, in the pedal reaction force applying apparatus of the second aspect of the invention, characterized in that the reaction-force changing mechanism includes a feed screw mechanism for linearly moving a spring seat which is held in engagement with the other of the opposite ends of the spring member, toward and away from the connected portion of the pedal member, by action of a screw.

A fifth aspect of the invention is, in the pedal reaction force applying apparatus of any one of the first through fourth aspects of the inventions, characterized in that the reaction-force controlling device includes a transmission mechanism which mechanically connects the pedal member with the reaction-force applying device, and which changes the pedal reaction force by mechanically activating the reaction-force applying device upon depression of the pedal member.

A sixth aspect of the invention is, in the pedal reaction force applying apparatus of any one of the first through fourth aspects of the inventions, characterized in that the reaction-force controlling device includes (a) a stroke sensor for electrically detecting the depressing stroke of the pedal member, and (b) an electronic controller for electrically controlling the reaction-force applying device on the basis of the depressing stroke of the pedal member detected by the stroke sensor, and in that (c) the reaction-force applying device is equipped with a drive device for changing the pedal reaction force on the basis of a signal supplied from the electronic controller.

A seventh aspect of the invention is, in the pedal reaction force applying apparatus for applying a predetermined pedal reaction force to a pedal member which is operationally depressed to be pivoted about a support axis, characterized in that there is provided (a) a cam member which is disposed in a predetermined position distant from the support axis and which is pivotable about its pivot axis that is parallel with the support axis, the cam member having an engaged portion whose distance from the pivot axis is continuously changed; (b) a transmission mechanism which mechanically connects the pedal member with the cam member, and which mechanically pivots the cam member upon depression of the pedal member; and (c) a spring member which is interposed between the cam member and a predetermined connected portion of the pedal member that is distant from the support axis, the spring member being mechanically elastically deformed upon depression of the pedal member, for thereby applying the pedal reaction force to the pedal member, the spring member having an engaged end portion which is engaged with the engaged portion of the cam member and which is displaceable following a profile of the engaged portion of the cam member, for thereby changing the pedal reaction force applied to the pedal member.

In the pedal reaction force applying apparatus of the first aspect of the invention, there is provided the reaction-force applying device for applying the pedal reaction force to the pedal member and changing the pedal reaction force. The reaction-force applying device is controlled by the reaction-force controlling device such that the pedal reaction force is changed on the basis of the depressing stroke of the pedal member, according to the predetermined change pattern. Therefore, where the change pattern is adapted to be close to a reaction characteristic of a conventional hydraulically or vacuum boosted braking system, for example, a driver accustomed to the hydraulically or vacuum boosted braking system does not have a strange feeling in depressing the pedal member. That is, it is possible to easily establish a desired reaction characteristic, thereby making possible to improve the pedal maneuverability of a brake-by-wire braking system.

In the pedal reaction force applying apparatus of the second aspect of the invention, the spring member is used as the reaction-force applying device, and is connected with the predetermined connected portion of the pedal member that is distant from the support axis. It is therefore possible to apply a large pedal reaction force to the pedal member, easier than in an arrangement in which the reaction-force applying device is disposed in the vicinity of the support axis. Further, the pedal reaction force applying apparatus of the second aspect of the invention can be constructed easily and inexpensively, since the pedal reaction force can be easily changed by simply displacing the above-described one or other end of the spring member by the reaction-force changing mechanism.

In the pedal reaction force applying apparatus of the third aspect of the invention in which the cam member is used as the reaction-force changing mechanism, it is possible to suitably adjust amount of deformation of the spring member in relation with the depressing stroke of the pedal member, namely, suitably establish characteristic of the pedal reaction force, by suitably determining the profile of the engaged portion of the cam member and the pivot amount of the cam member in relation with the depressing stroke.

In the pedal reaction force applying apparatus of the fourth aspect of the invention in which the feed screw mechanism is used as the reaction-force changing mechanism, it is possible to suitably adjust amount of deformation of the spring member in relation with the depressing stroke of the pedal member, namely, suitably establish characteristic of the pedal reaction force, by suitably determining the amount of rotation of the feed screw in relation with the depressing stroke.

In the pedal reaction force applying apparatus of the fifth aspect of the invention, there is used the reaction-force controlling device which mechanically changes the pedal reaction force applied by the reaction-force applying device. Therefore, the apparatus of the fifth aspect of the invention can be constructed more inexpensively than the apparatus of the sixth aspect of the invention in which the pedal reaction force is electrically controlled by using the drive device.

In the pedal reaction force applying apparatus of the sixth aspect of the invention in which the pedal reaction force is electrically changed by the electronic controller, the degree of freedom of determination of the change pattern is high, so that the pedal reaction force applying apparatus can be easily adapted for various kinds of vehicle by changing the change pattern.

In the pedal reaction force applying apparatus of the seventh aspect of the invention which corresponds to one embodied form of the first through third and fifth aspects of the invention, the spring member interposed between the pedal member and the cam member is mechanically elastically deformed upon depression of the pedal member, for thereby applying the pedal reaction force to the pedal member, while the cam member is pivoted by the transmission mechanism upon depression of the pedal member whereby the engaged end portion of the spring member engaged with the cam member is displaced following the profile of the engaged portion, for thereby changing the pedal reaction force applied to the pedal member. Therefore, it is possible to suitably adjust amount of deformation of the spring member in relation with the depressing stroke of the pedal member, namely, suitably establish characteristic of the pedal reaction force, by suitably determining the profile of the engaged portion of the cam member and the amount of the pivot motion of the cam member caused by the transmission mechanism. Therefore, where the change pattern is adapted to be close to a reaction characteristic of a conventional brake booster, for example, a driver accustomed to the hydraulically or vacuum boosted braking system does not have a strange feeling in depressing the pedal member. That is, it is possible to easily establish a desired reaction characteristic, thereby making possible to improve the pedal maneuverability of a brake-by-wire braking system.

Further, in the present invention, the cam member provided with the engaged portion is mechanically pivoted by the transmission mechanism upon depression of the pedal member, wherein the number of spring member may be one. Therefore, the apparatus can be constructed more inexpensively than an apparatus in which the desired reaction characteristic is established by rotating the cam member with a drive device such as an electric motor, or in which a plurality of spring members are used.

The pedal reaction force applying apparatus of the present invention is advantageously used for a pedal member of a by-wire system for a vehicle, such as a service braking system, an accelerating system and a parking braking system. Particularly, the pedal reaction force applying apparatus of the present invention is advantageously used in a brake-by-wire service braking system that replaces a conventional hydraulically or vacuum boosted service braking system in which the pedal member receives a large reaction force.

The reaction-force applying device for applying the pedal reaction force to the pedal member may be constructed to have the spring member as in the apparatus of the second aspect of the invention. However, it is possible to adopt various means for applying the pedal reaction force such as means for biasing the pedal member in a direction opposite to a depressing direction in which the pedal member is depressed, and means for limiting movement (pivot motion) of the pedal member in the depressing direction. That is, the pedal reaction force may be provided by, for example, a motor torque of an electric motor, a magnetic force of an electromagnet or a friction force of a friction-engagement device.

As the spring member of the reaction-force applying device, a compression coil spring or a tensile coil spring is preferably used. However, it is possible to use a torsion coil spring or other spring member. It is also possible to use a pneumatic spring such as an air spring, or a hydraulic spring.

The spring member, for example, is held in a predetermined position by a holding member, such that the spring member is connected at one of its opposite ends with the pedal member, pivotably about a connecting axis parallel with the support axis, and such that the spring member is engaged at the other of its opposite ends with the engaged portion of the cam member, movably relative to the engaged portion of the cam member, so that the other end of the spring member is displaced by pivot motion of the cam member. The holding member, for example, is disposed pivotably about the pivot axis of the cam member, and holds the spring member which is connected at the one of its opposite ends with the pedal member pivotably about the connecting axis such that an axis of the spring member such as a compression coil spring and a tensile coil spring lies substantially on a straight line connecting the connecting axis and the pivot axis.

It is noted that the spring member may be adapted to serve also as a return spring. However, it is possible to adopt any other arrangements such as an arrangement in which the spring member is disposed independently of the return spring.

In the second aspect of the invention, the spring member is connected with the connected portion of the pedal member which portion is distant from the support axis. However, a torsion coil spring may be disposed coaxially with the support axis, for applying the pedal reaction force to the pedal member. In that case, the pedal reaction force can be changed according to a desired change pattern such as a non-linear form, by loosing or tightening winding of the torsion coil spring.

The engaged portion of the cam member may be provided, for example, by an outer circumferential surface of the cam member. However, the engaged portion may be provided by also a groove formed in an end face of the cam member.

Each of the cam member of the third aspect of the invention and the feed screw mechanism of the fourth aspect of the invention is adapted to move the above-described other end of the spring member toward and away from the connected portion of the pedal member. However, each of the cam member and the feed screw mechanism may be disposed at the above-described one end of the spring member, i.e., in the connected portion of the pedal member, for thereby displacing the one end of the spring member relative to the connected portion of the pedal member, so as to change the pedal reaction force. The same thing can be said of the cam member of the seventh aspect of the invention.

That is, the cam member may be pivotably disposed in the connected portion of the pedal member, and the engaged portion whose distance from the pivot axis is continuously changed may be held in engagement with the above-described one end of the spring member, so that the one end of the spring member is displaced by the engaged portion, relative to the connected portion of the pedal member, as a result of pivot motion of the cam member about the pivot axis.

Similarly, the feed screw mechanism may be disposed in the connected portion of the pedal member, and the spring seat held in engagement with the above-described one end of the spring member is linearly moved by action of the screw, so that the one end of the spring member is displaced relative to the connected portion of the pedal member.

The transmission mechanism of the fifth aspect of the invention may be constructed to include, for example, a pair of pulleys which are respectively provided in a supported portion of the pedal member and the reaction-force changing mechanism such as the cam member, and a timing belt connecting the pair of pulleys. However, the pulleys and the timing belt may be replaced with a pair of sprockets and chains. Further, the transmission mechanism may be otherwise constituted, for example, by a plurality of gears, a pair of fan-shaped meshing members, a rack and a pinion, or a bar link which links the reaction-force changing mechanism and the pedal member.

The electronic controller of the sixth aspect of the invention is constructed to include, for example, a microcomputer, while the drive device for changing the pedal reaction force is provided, for example, by an electric motor or other actuator for rotating the cam member or the feed screw. Where the pedal reaction force applied by the reaction-force applying device is generated by a motor torque of an electric motor, a magnetic force of an electromagnet or a friction force of a friction-engagement device, it is possible to electrically control the electric motor, the electromagnet or the friction engagement device per se as the drive device.

Preferred embodied forms of the present invention will be explained in more detail. One embodied form is characterized in that the pedal reaction force applying apparatus according to any one of the first through seventh aspects of the invention is used in an electric service brake pedal device for a vehicle.

Another embodied form of the invention is characterized in that the spring member of the second aspect of the invention is a single one compression coil spring.

Still another embodied form of the invention is characterized in that the spring member of the second aspect of the invention is a single one tension coil spring.

Still another embodied form of the invention is characterized in that the spring member of the second aspect of the invention serves also as return spring for pivoting the pedal member in a direction toward its home position.

Still another embodied form of the invention is, in the third aspect of the invention, characterized in that the spring member is held in a predetermined position by a holding member, such that the spring member is connected at one of its opposite ends with the pedal member, pivotably about a connecting axis parallel with the support axis, and such that the spring member is engaged at the other of its opposite ends with the engaged portion of the cam member, movably relative to the engaged portion of the cam member, so that the other end of the spring member is displaced by pivot motion of the engaged portion of the cam member.

Still another embodied form of the invention is, in the third aspect of the invention, characterized in that the engaged portion of the cam member is constructed to have an outer circumferential surface of the cam member whose distance from the pivot axis is continuously changed.

Still another embodied form of the invention is, in the fifth aspect of the invention, characterized in that the transmission mechanism is constructed to have a first pulley which is provided in a supported portion of the pedal member, so as to be pivoted together with the pedal member about the support axis, a second pulley which is provided in a reaction-force changing mechanism such as the cam member, and a timing belt which connects the first and second pulleys.

Still another embodied form of the invention is, in the fifth aspect of the invention, characterized in that the transmission mechanism is constructed to have a first meshing member which is provided in a supported portion of the pedal member, so as to be pivoted together with the pedal member about the support axis, and a second meshing member which is provided in a reaction-force changing mechanism such as the cam member and which is held in meshing engagement with the first meshing member.

Still another embodied form of the invention is, in the sixth aspect of the invention, characterized in that the drive device is an electric motor which rotates a reaction-force changing mechanism such as a cam member and a feed screw mechanism.

DETAILED DESCRIPTION OF TEE INVENTION

There will be described in detail an embodiment of the present invention, with reference to the drawings.

Figure 1A:
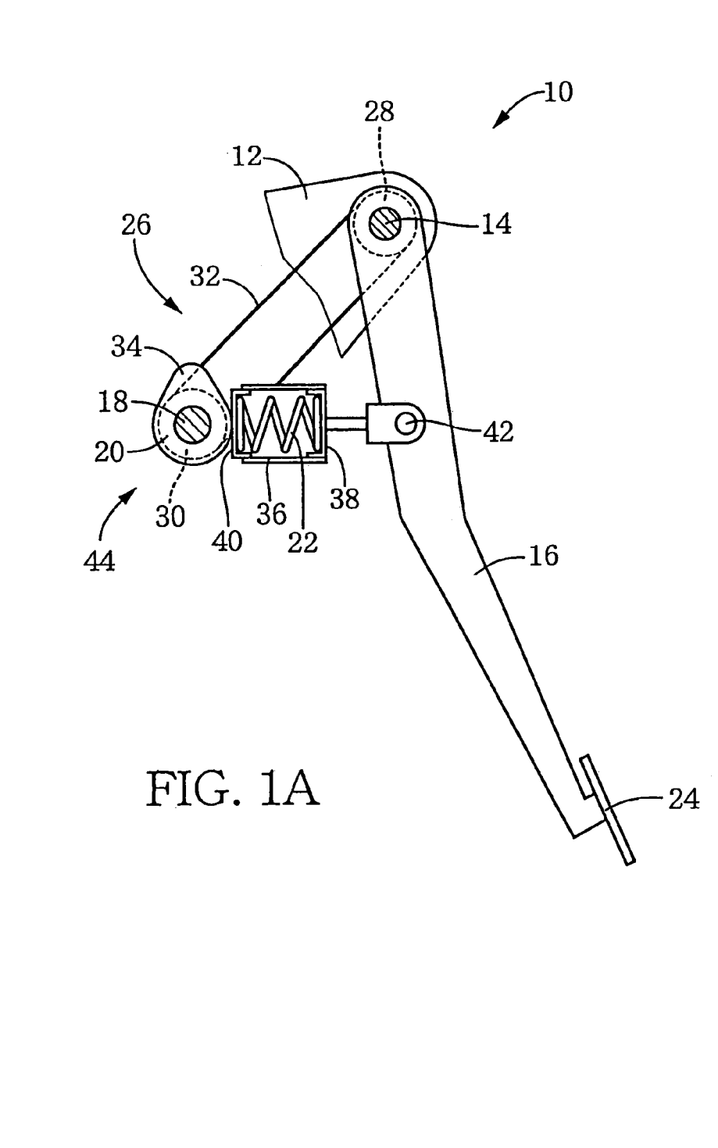
FIG. 1A is a view of a pedal reaction force applying apparatus constructed according to one embodiment of the invention, showing a state in which a pedal member is held in its home position.
Figure 1B:
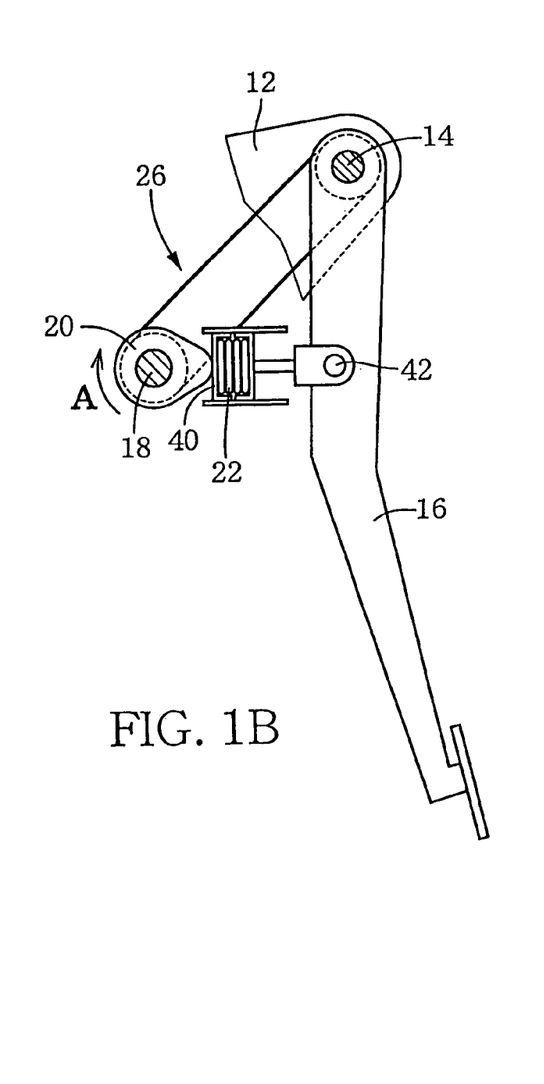
FIG. 1B is a view of the pedal reaction force applying apparatus, showing a state in which the pedal member is operated to be depressed.

FIG. 1 is a view showing a pedal reaction force applying apparatus 10 which is one embodiment of the present invention and which is advantageously used in, for example, a brake-by-wire service braking system for a vehicle. This pedal reaction force applying apparatus 10 is equipped with a pedal member 16 disposed pivotably about an axis of a support shaft 14 which is provided in a bracket 12, a cam member 20 disposed pivotably about an axis of a pivot shaft 18 which is provided in the bracket 12 and which is parallel with the support shaft 14, and a compression coil spring 22 interposed between the pedal member 16 and the cam member 20.

The pedal member 16 is pivotably connected at its upper end portion with the support shaft 14, and is pivoted about the axis of the support shaft 14 in the clockwise direction as a result of an operator's depression operation effected on a pad portion 24 which is provided by a lower end portion of the pedal member 16. An amount of the pivot motion of the pedal member 16 is detected by a not-shown sensor (such as a stroke sensor 88 in FIG. 5), so that a braking force corresponding to the detected amount of the pivot motion is generated by a hydraulically or otherwise operated brake. FIG. 1A shows a state in which the pedal member 16 is held in its home position before the depression of the pedal member 16, while FIG. 1B shows a state in which the pedal member 16 is being operated to be depressed.

The cam member 20 is disposed on a front side of the pedal member 16 as viewed in a vehicle running direction, and is mechanically pivoted about the axis of the pivot shaft 18 by a transmission mechanism 26, upon depression of the pedal member 16. The transmission mechanism 26 is equipped with a first pulley 28 which is disposed pivotably about the axis of the support shaft 14 so as to be pivoted together with the pedal member 16, a second pulley 30 which is disposed pivotably about the axis of the pivot axis 18 so as to be pivoted together with the cam member 20, and a timing belt 32 which connects the first and second pulleys 28, 30, for transmitting the pivot motion of the pedal member 16 to the cam member 20. The cam member 20 is pivoted, as shown in FIG. 1B, about the axis of the pivot shaft 18 by a predetermined angle in the clockwise direction as indicated by arrow A, as a result of depression of the pedal member 16. An amount of the pivot motion of the cam member 20 in relation with the depressing stroke of the pedal member 16 can be suitably determined depending upon ratios of diameters of the pulleys 28, 30.

The cam member 20 has an integrally-formed lobe portion 34 which outwardly projects such that its diameter is continuously changed, and which serves as an engaged portion of the cam member 20. The compression coil spring 22 is forced, by its own spring force, onto an outer circumferential surface of the cam member 20. When the cam member 20 is clockwise pivoted about the axis of the pivot shaft 18 as a result of depression of the pedal member 16, the lobe portion 34 takes a posture projecting toward the compression coil spring 22 as shown in FIG. 1B, so that an end portion of the compression coil spring 22 held in engagement with the cam member 20 is continuously displaced, depending upon a projection amount and a projection shape of the lobe portion 34, in a direction away from the pivot shaft 18.

The compression coil spring 22 serves as a spring member for applying a pedal reaction force to the pedal member 16, and serves also as a return spring for returning the pedal member 16 to its home position. The compression coil spring 22 is substantially coaxially held within a tubular holding member 36, and is received at its opposite end portion by a pair of spring seats 38, 40 which are axially movably fitted in the tubular holding member 36. The holding member 36 is disposed in the bracket 12 such that the holding member 36 is pivotable about the axis of the pivot shaft 18, while one 38 of the spring seats 38, 40 is connected with a connected portion of the pedal member 16 that is distant from the support shaft 14 such that the spring seat 38 is pivotable about a connecting shaft 42 which is disposed in parallel with the support shaft 14, whereby the holding member 36 and the compression coil spring 22 are held such that the axis of holding member 36 and the compression coil spring 22 lies substantially on a straight line connecting the pivot shaft 18 and the connecting shaft 42. The other spring seat 40 is forced, by the spring force of the compression coil spring 22, onto the outer circumferential surface of the cam member 20, such that the spring seat 40 is displaceable relative to the outer circumferential surface of the cam member 20.

In this arrangement, when the pedal member 16 is operated to be depressed as shown in FIG. 1B, the compression coil spring 22 is compressively deformed in its axial direction between the pedal member 16 and the cam member 20, so that a pedal reaction force is applied to the pedal member 16 as a result of the compressive deformation of the compression coil spring 22. Further, owing to the transmission mechanism 26, the depression of the pedal member 16 causes also a clockwise pivot motion of the cam member 20 about the axis of the pivot axis 18, whereby the spring seat 40 is displaced by the lobe portion 34 of the cam member 20, in a direction away from the pivot shaft 18. Owing to the displacement of the spring seat 40 in the direction away from the pivot shaft 18, an amount of the elastic deformation of the compression coil spring 22, i.e., the pedal reaction force applied to the pedal member 16 is changed in accordance with a predetermined non-linear change pattern. The cam member 20 corresponds to the reaction-force changing mechanism, and cooperates with the compression coil spring 22 as the spring member to constitute a changeable reaction-force applying device 44. The transmission mechanism 26 serves as a reaction-force controlling device.

Since the pedal reaction force applied to the pedal member 16 by the compression coil spring 22 is changed by the change of amount of the elastic deformation of the compression coil spring 22, it is possible to obtain a reaction characteristic similar to that of a conventional hydraulically or vacuum boosted braking system, by suitably determining the projection amount and shape of the lobe portion 34, or the amount of the pivot motion of the cam member 20 caused by the transmission mechanism 26, in relation with the depressing stroke of the pedal member 16, thereby no longer causing a driver accustomed to the hydraulically or vacuum boosted braking system to have a strange feeling in depressing the pedal member 16. The pedal maneuverability of the brake-by-wire braking system is thus improved.

Further, in the present embodiment, the cam member 20 is mechanically pivoted by the transmission mechanism 26 upon depression of the pedal member 16, and the number of the compression coil spring 22 to be provided in the apparatus 10 may be one. Therefore, the apparatus can be constructed more easily and inexpensively than an apparatus in which a desired reaction characteristic is established by rotating the cam member 20 with an electric motor, or in which a plurality of spring members are used. Further, the apparatus can be compact in construction, and can be installed in the bracket 12 which is located in a front side of a driver's seat, with a high degree of freedom in designing the arrangement of the apparatus.

Further, the compression coil spring 22 for applying the pedal reaction force to the pedal member 16 is connected with the connecting shaft 42 disposed in a longitudinally intermediate portion of the brake pedal 16 which portion is distant from the supporting shaft 14. It is therefore possible to apply a large pedal reaction force to the pedal member 16, easier than in an arrangement wherein the pedal reaction force is applied to a portion of the pedal member 16 which portion is close to the axis of the support shaft 14. Further, the apparatus can be constructed easily and inexpensively, since the pedal reaction force can be easily changed by simply displacing the end of the compression coil spring 22 by the cam member 20.

Next, there will be explained other embodiments of the present invention. It is noted that the same reference numerals as used in the above-described embodiment will be used to identify the substantially similar portions, which will not be explained in detail.

Figure 2:
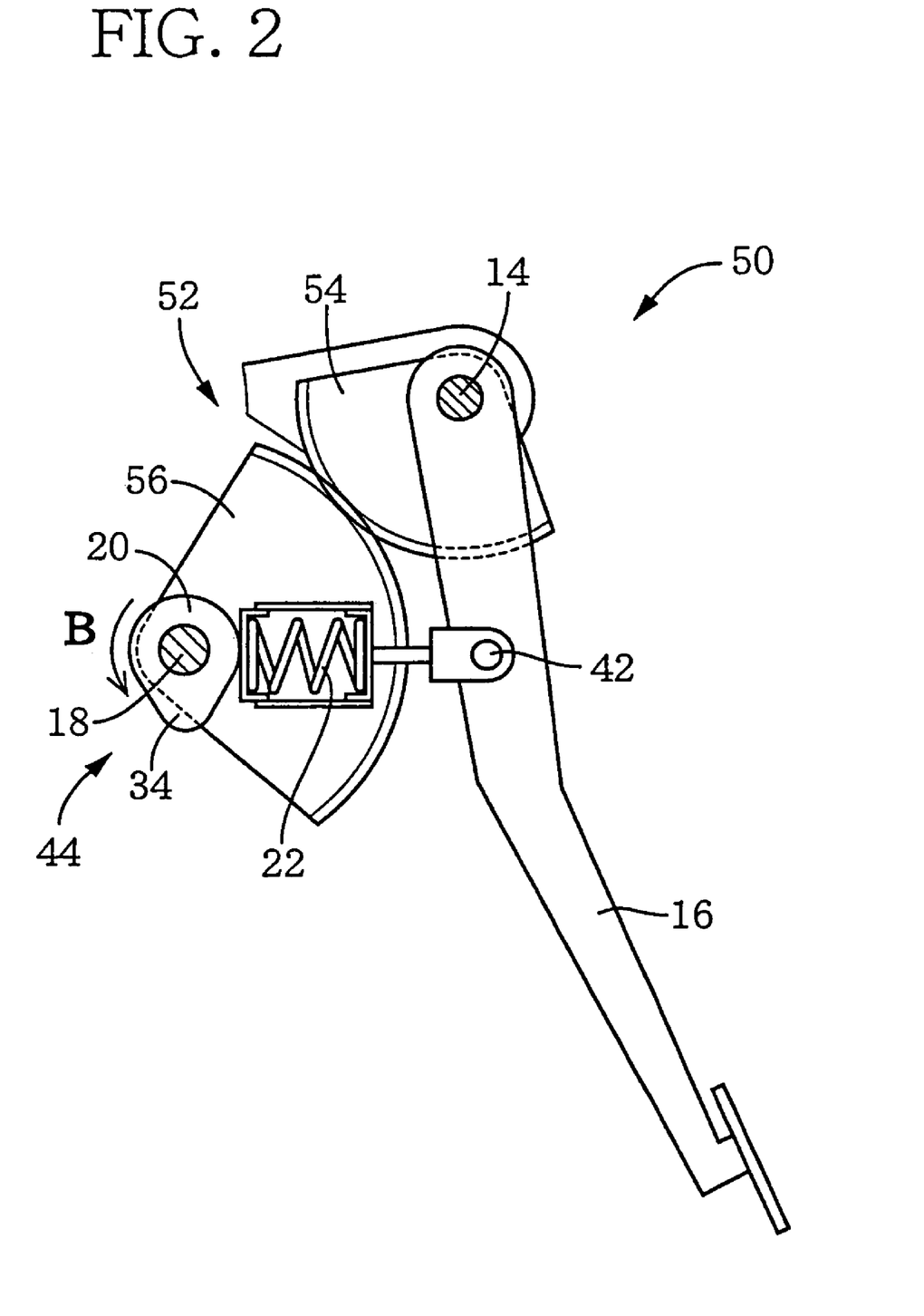
FIG. 2 is a view of a pedal reaction force applying apparatus constructed according to another embodiment of the invention, in which a pedal reaction force is controlled by a transmission mechanism as in the apparatus of FIGS. 1A and 1B.

A pedal reaction force applying apparatus 50 of FIG. 2 is different from the above-described embodiment in its transmission mechanism 52. That is, the transmission mechanism 52 is equipped with a first fan-shaped meshing member 54 which is disposed pivotably about the axis of the support shaft 14 so as to be pivoted together with the pedal member 16, and a second fan-shaped meshing member 56 which is disposed pivotably about the axis of the pivot shaft 18 so as to be pivoted together with the cam member 20. The first and second meshing members 54, 56 are held in meshing engagement at their respective arcuate portions, so that the cam member 20 is pivoted about the axis of the pivot shaft 18 by a predetermined angle in the counterclockwise direction as indicated by arrow B, as a result of depression of the pedal member 16. An amount of the pivot motion of the cam member 20 in relation with the depressing stroke of the pedal member 16 can be suitably determined depending upon a gear ratio or a ratio of diameters of the first and second meshing members 54, 56. Therefore, like in the above-described embodiment, it is possible to adjust the characteristic of the pedal reaction force applied by the compression coil spring 22, namely, the change pattern of the pedal reaction force in relation with the depressing stroke.

Figure 3:
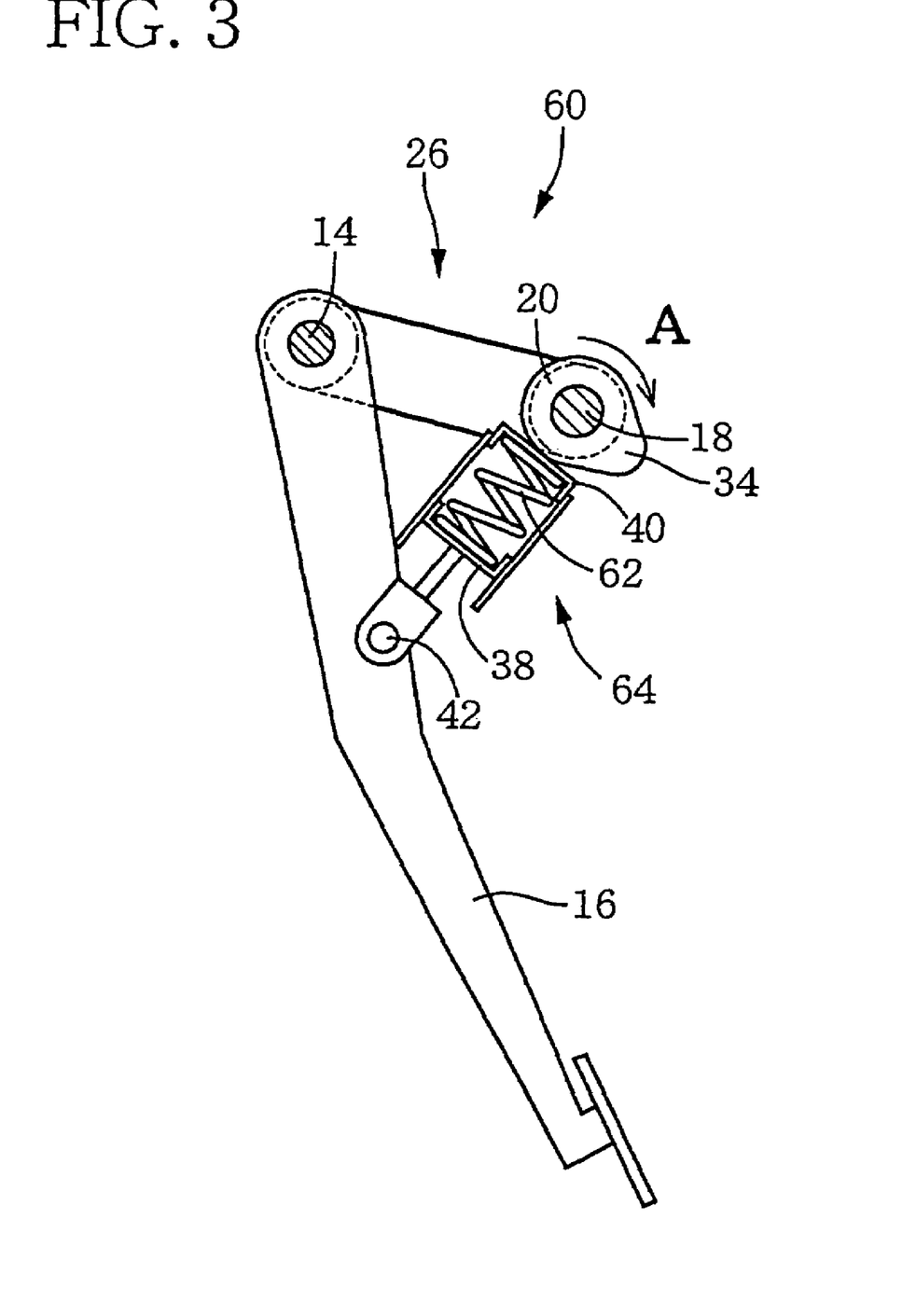
FIG. 3 is a view of a pedal reaction force applying apparatus constructed according to still another embodiment of the invention, in which a pedal reaction force is controlled by a transmission mechanism as in the apparatus of FIGS. 1A and 1B.

A pedal reaction force applying apparatus 60 of FIG. 3 is different from the above-described pedal reaction force applying apparatus 10, in that the pivot shaft 18 is located on a rear side of the pedal member 16 as viewed in the vehicle running direction so that the cam member 20 and the connecting shaft 42 are moved away from each other upon depression of the pedal member 16, and in that the compression coil spring 22 is replaced with a tension coil spring 62 to constitute a changeable reaction-force applying device 64 so that the pedal reaction force is applied to the pedal member 16 as a result of tensile deformation of the tension coil spring 62. The tension coil spring 62 is integrally fixed (engaged) at its opposite end portions to the spring seats 38, 40, and is tensed upon depression of the pedal member 16. The spring seat 40 is engaged with the outer circumferential surface of the cam member 20 such that the spring seat 40 is movable relative to the outer circumferential surface of the cam member 20 in the circumferential direction and is not separable from the cam member 20, so that the spring seat 40 is displaced following the profile of the lobe portion 34 of the cam member 20. In this embodiment, too, it is possible to suitably establish characteristic of the pedal reaction force in relation with the depressing stroke of the pedal member 16, by suitably changing the amount of the pivot motion of the cam member 20 caused by the transmission mechanism 26, in relation with the depressing stroke of the pedal member 16, or by suitably changing the position, projection amount and shape of the lobe portion 34.

Figure 4:
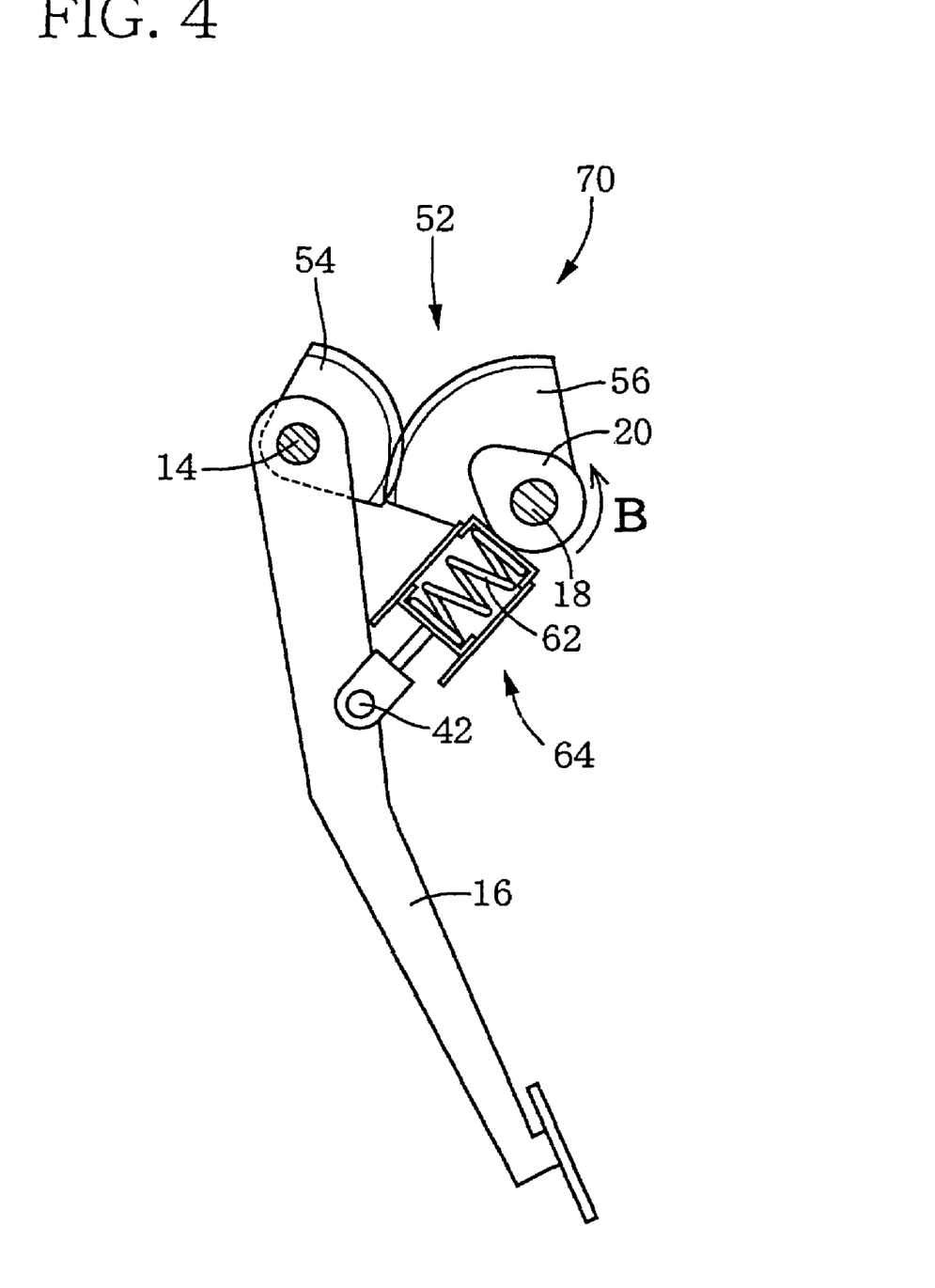
FIG. 4 is a view of a pedal reaction force applying apparatus constructed according to still another embodiment of the invention, in which a pedal reaction force is controlled by a transmission mechanism as in the apparatus of FIGS. 1A and 1B.

In a pedal reaction force applying apparatus 70 of FIG. 4, in which the transmission mechanism 26 of the pedal reaction force applying apparatus 60 of FIG. 3 is replaced with the transmission mechanism 52 of FIG. 2, it is possible to obtain an effect similar to that of the pedal reaction force applying apparatus 60.

Figure 5:
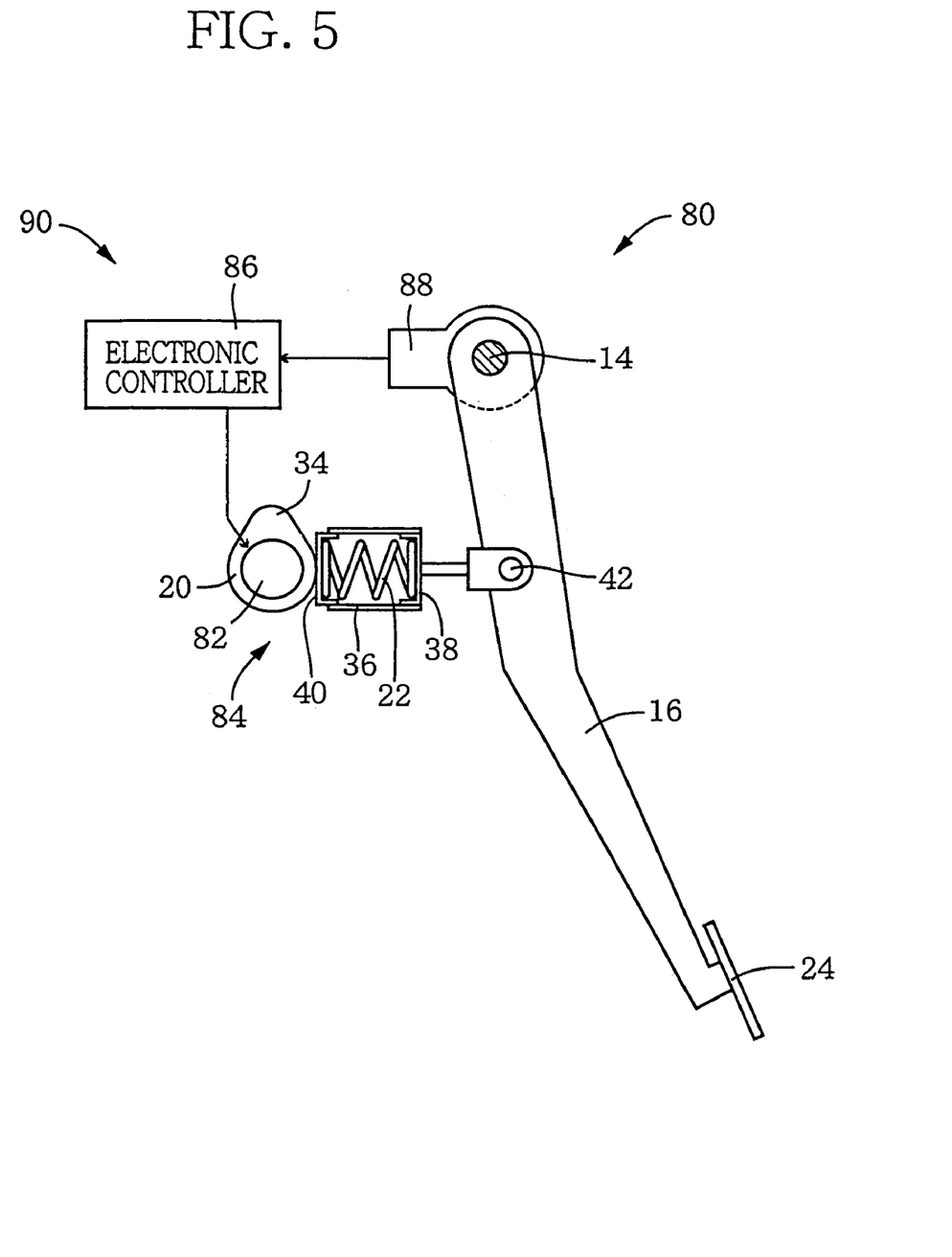
FIG. 5 is a view of a pedal reaction force applying apparatus constructed according to still another embodiment of the invention, in which a pedal reaction force is controlled by an electronic controller.

A pedal reaction force applying apparatus 80 of FIG. 5 is different from the pedal reaction force applying apparatus 10 of FIG. 1 in that an electric motor (stepping motor) 82 constitutes a changeable reaction-force applying device 84 for pivoting the cam member 20, and in that the pedal reaction force is changed by controlling the activation (pivot amount) of the electric motor 82 by an electronic controller 86 which has a microcomputer. The electronic controller 86 for controlling a braking force receives a signal representative of the depressing stroke of the pedal member 16, from a stroke sensor (potentiometer) 88 which electrically detects the depressing stroke. The pivot amount of the cam member 20 is controlled with the pivot motion of the electric motor 82 in its forward and reverse directions, on the basis of the depressing stroke as a parameter, according to a predetermined map or arithmetic expression, such that the pedal reaction force is changed in accordance with a predetermined non-linear change pattern. In the present embodiment in which the same cam member 20 is used as in the pedal reaction force applying apparatus 10 of FIG. 1, it is possible to obtain a reaction characteristic similar to that of the pedal reaction force applying apparatus 10 of FIG. 1, by controlling the pivot amount of the cam member 20 substantially in proportion to the depressing stroke. The electronic controller 86 and the stroke sensor 88 cooperate with each other to constitute a reaction-force controlling device 90. The electric motor 82 corresponds to a drive device of the changeable reaction-force applying device 84.

Like in the above-described embodiments, in this case, too, it is possible to obtain a reaction characteristic similar to that of a conventional hydraulically or vacuum boosted braking system, by suitably determining the profile of the cam member 20, or the pivot amount of the cam member 20 in relation with the depressing stroke of the pedal member 16, thereby improving the pedal maneuverability of the brake-by-wire braking system. In addition, in the present embodiment in which the pedal reaction force is electrically changed by controlling the pivot amount of the cam member 20 by the electronic controller 86, the degree of freedom in designing the change pattern is so high that it is possible to easily deal with various kinds of vehicles by simply changing the change pattern, namely, the map or arithmetic expression having the parameter in the form of the depressing stroke.

Figure 6:
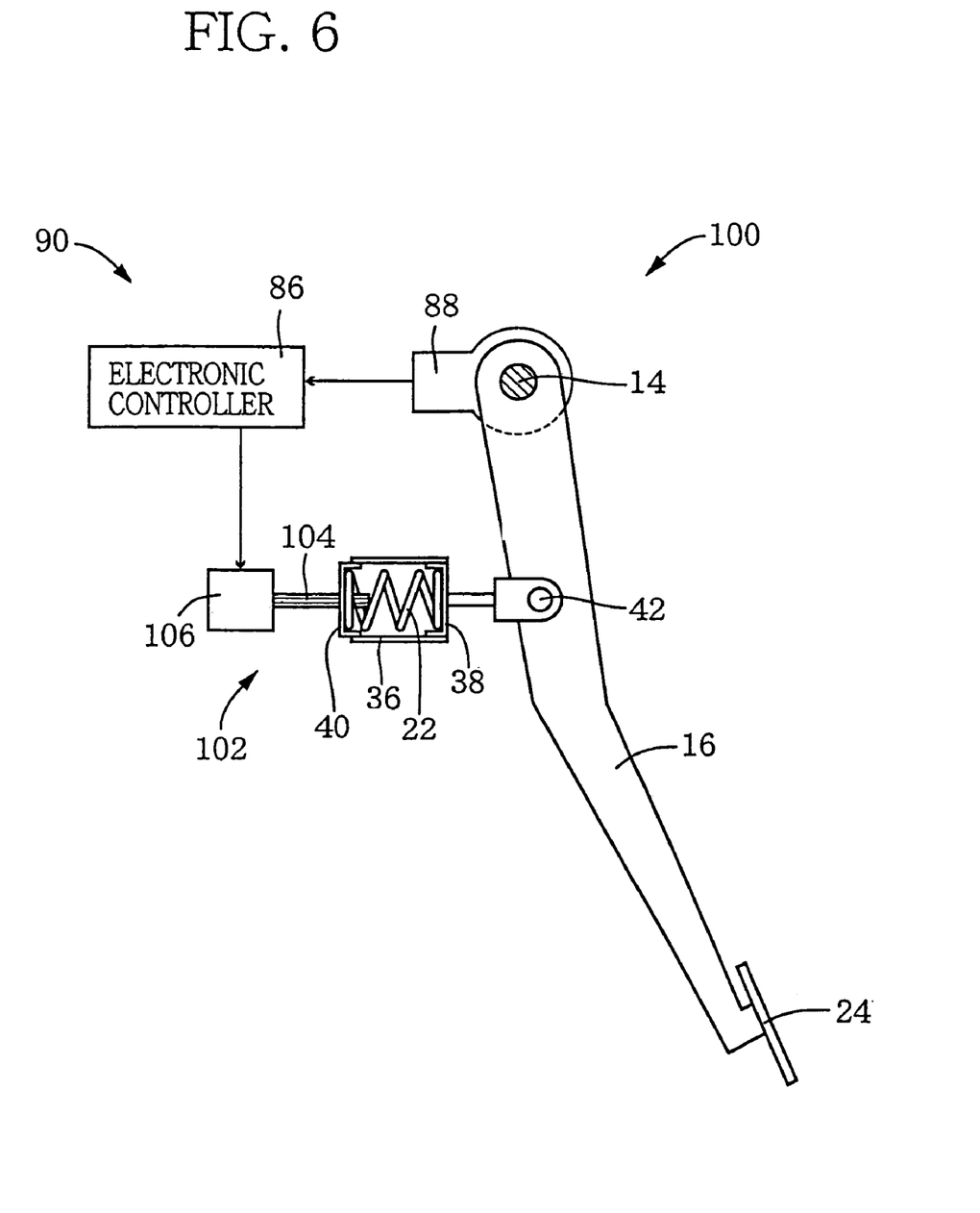
FIG. 6 is a view of a pedal reaction force applying apparatus constructed according to still another embodiment of the invention, in which a pedal reaction force is controlled by an electronic controller as in the apparatus of FIG. 5.

A pedal reaction force applying apparatus 100 of FIG. 6 is different from the pedal reaction force applying apparatus 80 of FIG. 5 in construction of a changeable reaction-force applying device 102. This changeable reaction-force applying device 102 changes the pedal reaction force, i.e., the elastic deformation amount of the compression coil spring 22 by a feed screw mechanism. An externally threaded shaft 104 is screwed in an internally threaded hole formed in one 40 of the spring seats 38, 40 which one is remote from the pedal member 16. This externally threaded shaft 104 is rotatable in its forward and reverse directions through an electric motor (stepping motor) 106 controlled by the electronic controller 86, so that the spring seat 40 is linearly movable with rotation of the externally threaded shaft 104, toward and away from the connecting shaft 42, for thereby changing the pedal reaction force applied to the pedal member 16. The rotation amount of the threaded shaft 104, i.e., the position of the spring seat 40 is controlled according to the predetermined map or arithmetic expression having the parameter in the form of the depressing stroke. The pedal reaction force is thus changed according to the predetermined change pattern, thereby making it possible to obtain an effect similar to that of the above-described embodiments. The electronic motor 106 corresponds to a drive device of the changeable reaction-force applying device 102.

Figure 7:
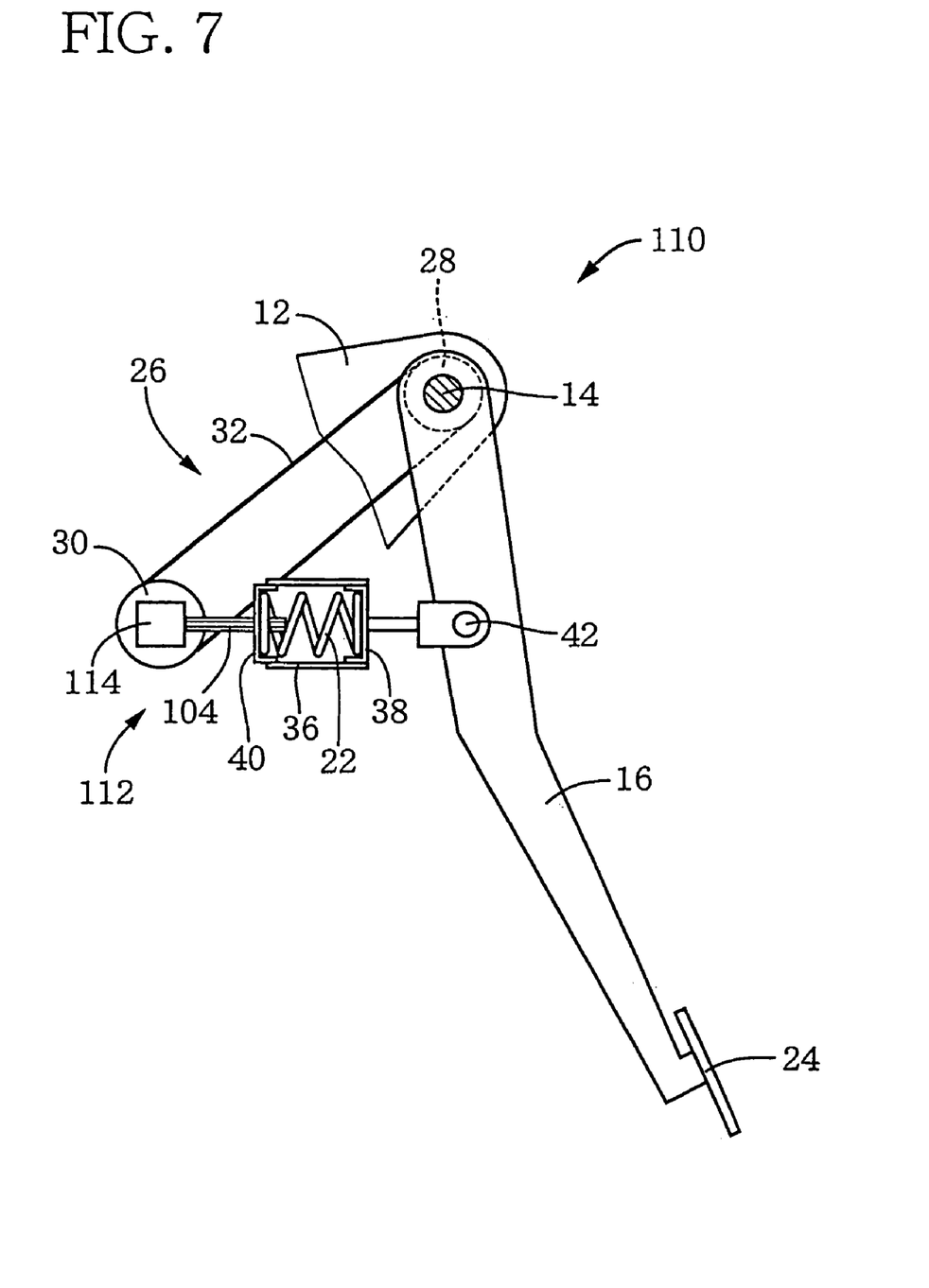
FIG. 7 is a view of a pedal reaction force applying apparatus constructed according to still another embodiment of the invention, in which a pedal reaction force is controlled by a transmission mechanism.

A pedal reaction force applying apparatus 110 of FIG. 7 is different from the pedal reaction force applying apparatus 100 of FIG. 6 in that a changeable reaction-force applying device 112 is not equipped with the electric motor 106, and in that the transmission mechanism 26 is provided in place of the reaction-force control device 90. The threaded shaft 104 is mechanically rotated through the transmission mechanism 26 and an auxiliary transmission mechanism 114 such as bevel gears, as a result of the depression of the pedal member 16, for thereby changing the amount of the elastic deformation amount of the compression coil spring 22, i.e., the pedal reaction force applied to the pedal member 16. Thus, in the pedal reaction force applying apparatus 110, it is possible to obtain an effect similar to that of the first embodiment.

The embodiments of the present invention have been explained in detail with reference to the drawings. However, each of the embodiments is merely an embodied form, and the present invention can be embodied with various modifications and improvements on the basis of knowledge of those skilled in the art.

The invention claimed is:

1. A pedal reaction force applying apparatus for applying a reaction force to a pedal member which is pivotably supported by a support shaft and which is depressible to be pivoted about an axis of said support shaft, said apparatus comprising:

a reaction-force applying device for applying said reaction force to said pedal member and changing said reaction force;

a reaction-force controlling device for controlling said reaction-force applying device such that said reaction force is changed on the basis of a depressing stroke of said pedal member, according to a predetermined pattern of chance of said reaction force, wherein said reaction-force applying device includes:

a spring member which is connected, at one of opposite ends thereof, with a connected portion of said pedal member that is spaced away from said axis of said support shaft, and which is elastically deformed upon depression of said pedal member, for thereby applying said reaction force to said pedal member; and a reaction-force changing mechanism for changing said reaction force, by moving the other of said opposite ends of said spring member toward and away from said connected portion of said pedal member.

wherein said reaction-force changing mechanism includes a cam member which is pivotable about an axis of a pivot shaft and which has an engaged portion whose distance from said axis of said pivot shaft is continuously changed as viewed in a circumferential direction of said cam member, and wherein said engaged portion of said cam member is held in engagement with said other of said opposite ends of said spring member, so that said other of said opposite ends of said spring member is movable toward and away from said connected portion of said pedal member, by said engaged portion as a result of the pivotable motion of said cam member.

2. An apparatus according to claim 1, wherein said reaction-force controlling device includes a transmission mechanism which connects said pedal member with said reaction-force applying device, for transmitting pivot motion of said pedal member to said reaction-force applying device upon depression of said pedal member.

3. An apparatus according to claim 1,
wherein said reaction-force controlling device includes a stroke sensor for detecting said depressing stroke of said pedal member, and a controller for controlling said reaction-force applying device on the basis of said depressing stroke of said pedal member detected by said stroke sensor,
and wherein said reaction-force applying device includes a drive device for changing said reaction force on the basis of a signal supplied from said controller.

4. An apparatus according to claim 1, wherein said engaged portion of said cam member is provided by an outer circumferential surface of said cam member.

5. An apparatus according to claim 1,
wherein said reaction-force controlling device includes a transmission mechanism which connects said pedal member with said cam member, for transmitting a pivotable motion of said pedal member to said cam member upon depression of said pedal member,
and wherein said transmission mechanism includes a first pulley which is pivotable together with said pedal member about said axis of said support shaft, a second pulley which is pivotable together with said cam member about said axis of said pivot shaft, and a timing belt which connects said first and second pulleys.

6. An apparatus according to claim 1,
wherein said reaction-force controlling device includes a transmission mechanism which connects said pedal member with said cam member, for transmitting a pivotable motion of said pedal member to said cam member upon depression of said pedal member,
and wherein said transmission mechanism includes a first meshing member which is pivotable together with said pedal member about said axis of said support shaft, and a second meshing member which is pivotable together with said cam member about said axis of said pivot shaft and which is held in meshing engagement with said first meshing member.

7. An apparatus for applying a reaction force to a pedal, member which is pivotably supported by a support shaft and which is depressible to be pivoted about an axis of said support shaft, said apparatus by comprising:
a cam member which is pivotable about an axis of a pivot shaft that is parallel with said axis of said support shaft, and which has an engaged portion whose distance from said axis of said pivot shaft is continuously changed as viewed in a circumferential direction of said cam member,
a transmission mechanism which connects said pedal member with said cam member, for transmitting pivot motion of said pedal member to said cam member upon depression of said pedal member and
a spring member which is interposed between said cam member and a longitudinally intermediate portion of said pedal member that is distant from said support axis of said support shaft, said spring member being elastically deformed upon depression of said pedal member, for thereby applying said reaction force to said pedal member, said spring member having an engaged end portion which is held in engagement with said engaged portion of said cam member and which is displaceable following a profile of said engaged portion of said cam member, for thereby changing said reaction force applied to said pedal member.

* * * * *

UNITED STATES PATENT AND TRADEMARK OFFICE
CERTIFICATE OF CORRECTION

PATENT NO. : 7,082,853 B2
APPLICATION NO. : 10/656151
DATED : August 1, 2006
INVENTOR(S) : Fujiwara It is certified that error appears in the above-identified patent and that said Letters Patent is hereby corrected as shown below:

Title page, item (73), Assignee line 2, "Aichi-Ken" should read --Aichi-ken--.

Col. 12, line 56, "chance" should read --change--.

Col. 12, line 67, "member." should read --member,--.

Col. 14, line 15, "pedal," should read --pedal--.

Col. 14, line 18, "apparatus by comprising:" should read --apparatus comprising:--.

Signed and Sealed this

Seventeenth Day of October, 2006

JON W. DUDAS
*Director of the United States Patent and Trademark Office*